(12) United States Patent
Seo

(10) Patent No.: US 7,545,861 B2
(45) Date of Patent: Jun. 9, 2009

(54) TIMING RECOVERY CIRCUIT AND TIMING RECOVERY METHOD

(75) Inventor: Il-Won Seo, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 889 days.

(21) Appl. No.: 10/917,452

(22) Filed: Aug. 13, 2004

(65) Prior Publication Data
US 2005/0084046 A1    Apr. 21, 2005

(30) Foreign Application Priority Data
Aug. 14, 2003    (KR) ...................... 10-2003-0056400

(51) Int. Cl.
  H04K 5/159    (2006.01)
  H04L 27/00    (2006.01)
  H04B 1/10     (2006.01)
  H03D 3/24     (2006.01)
(52) U.S. Cl. .................. 375/233; 375/326; 375/350; 375/376
(58) Field of Classification Search ................ 375/232, 375/233, 350, 355, 326, 376
See application file for complete search history.

(56) References Cited

U.S. PATENT DOCUMENTS

| 5,581,585 | A  | * | 12/1996 | Takatori et al. ............. 375/376 |
| 5,673,293 | A  | * | 9/1997  | Scarpa et al. ............... 375/321 |
| 6,249,557 | B1 | * | 6/2001  | Takatori et al. ............. 375/355 |
| 6,414,990 | B1 | * | 7/2002  | Jonsson et al. .............. 375/232 |
| 7,245,686 | B2 | * | 7/2007  | Weiss et al. ................. 375/372 |
| 2001/0031020 | A1 | * | 10/2001 | Hwang et al. ............... 375/316 |

FOREIGN PATENT DOCUMENTS

WO    WO 01/52469 A1    7/2001

* cited by examiner

*Primary Examiner*—Don N Vo
(74) *Attorney, Agent, or Firm*—Harness, Dickey & Pierce (57) ABSTRACT

A timing recovery circuit for a receiver may include a timing error detector that generates a timing error based on differences between coefficients of a feed-forward filter and a feed-back filter. The timing recovery circuit may include a loop filter which generates a control voltage signal based on the timing error, and a voltage controlled oscillator that generates a sampling clock for the receiver based on the generated control voltage signal.

13 Claims, 9 Drawing Sheets

TIMING RECOVERY CIRCUIT AND TIMING RECOVERY METHOD

CROSS-REFERENCE TO RELATED APPLICATIONS

This U.S. nonprovisional patent application claims priority under 35 U.S.C. § 119 of Korean Patent Application No. 2003-56400, filed on Aug. 14, 2003, the entire contents of which are hereby incorporated by reference.

BACKGROUND OF THE INVENTION

1. Field of the Invention

The present invention relates to a timing recovery circuit and a timing recovery method.

2. Description of the Related Art

In some wireless or high-speed data communication systems, signals arriving at a receiver by different paths show different time delays. This results in inter-symbol interference (ISI), a degradation in reception. Amplitude and phase of a received signal may be severely distorted, and may cause a bit error in the receiver.

For example, one high-speed data communication system where this is of concern is in systems employing Digital Subscriber Line (DSL) technology. DSL, which provides high-speed communications using telephone lines, requires the use of a wide band of frequencies to send more information than conventional voice calls require. Wideband modulation schemes need to take into account the broadband characteristics of the medium used to communicate. Twisted pair copper wire subscriber loops used to provide access to the local exchange in telephone circuits exhibit frequency dependent attenuation, with higher frequencies suffering more attenuation than the lower ones. Further, these subscriber loops also exhibit a non-linear phase response with frequency, with the lower frequencies exhibiting more non-linearity. This kind of channel characteristic results in the dispersion of an impulse, sent by the transmitter, at the receiver, thus corrupting the reception. This dispersion is referred to as ISI, and results in data loss and hence, loss of communication reliability.

A channel's limited bandwidth has a dispersive effect on the transmitted pulse. High-frequency loss in the channel tends to reduce the slope of the pulse edges resulting in finite rise times, known as 'precursor distortion'. At low frequencies, the nonlinear phase characteristics tend to produce a substantially long decay tail, or 'postcursor distortion', resulting in a smeared pulse shape. The "available" bandwidth and the phase characteristics of a channel are thus a function of the medium used. Distortion suffered by a given pulse results in interference to its neighbors in time. A given pulse is distorted by the presence of tails from past pulses and precursors of future pulses. This effect is known as the aforementioned ISI. Thus, at the receiver, detection of symbols is further complicated by the presence of pulse distortion in addition to noise. For a given channel, since the channel attenuation and noise characteristics can be determined a priori, ISI may be eliminated by predicting the channel's future and past influence on any received symbol. The process of eliminating ISI from the received data is referred to as equalization.

An equalizer of the receiver typically compensates the distortion due to ISI. The equalizer compensates amplitude and delay of the received signal in an effort to enhance the quality of the communication channel without increasing the power of transmitting signal, or without increasing channel bandwidth. In general, since channel properties are not known with exactness and vary over time, the receiver employs an adaptive Decision Feedback Equalizer (DFE) that changes a tap coefficient value of the equalizer, depending on the channel properties.

In a receiver of a general data communication system, an ADC (Analog-to-Digital Converter) converts a received continuous-time signal to a discrete-time signal. A clock of the receiver should be synchronized with a clock of a transmitter of the general data communication system. The most common circuit that extracts timing information (for example, frequency and/or phase information of the clock of the transmitter) is a Phase-Locked Loop (PLL). The PLL typically generates the clock of the receiver. The receiver traces the frequency and phase of the clock of the transmitter to compensate the clock of the receiver. The received signal is sampled using the clock of the receiver and is converted to digital data. A timing recovery circuit synchronizes the clock of the receiver with the clock of the transmitter. In a mobile communication system, a pilot signal is utilized to synchronize the clock of the receiver with the clock of the transmitter.

In digital data communication systems, the receiver extracts timing information from received data. One of the conventional methods of extracting timing information from the received data is disclosed in an article by Mueller et al., entitled, "Timing recovery in digital synchronous data receiver", IEEE Transactions on Communications, pp 516-531, Vol. 24, May 1976, which is incorporated by reference herein in its entirety. In this paper the authors propose a timing recovery algorithm referred to as an "M&M algorithm". The paper is accepted in the art as the basis for timing recovery algorithms.

The M&M algorithm may be embodied as hardware and has a stable loop property. However, when using a channel that severely distorts signals being transmitted through the channel, the M&M algorithm must utilize a shaping filter so that input signals have symmetric properties. In addition, timing errors increase for the severely distorted channel, according to the M&M algorithm.

Another method of extracting the timing information is through a cross-correlating precursor and timing error process. This process requires an exact control of a loop filter, however, since either the precursor or the timing error is distorted based on the channel status. Thus, extracting timing information by the cross-correlating precursor and timing error process requires substantial hardware.

Figure 1:
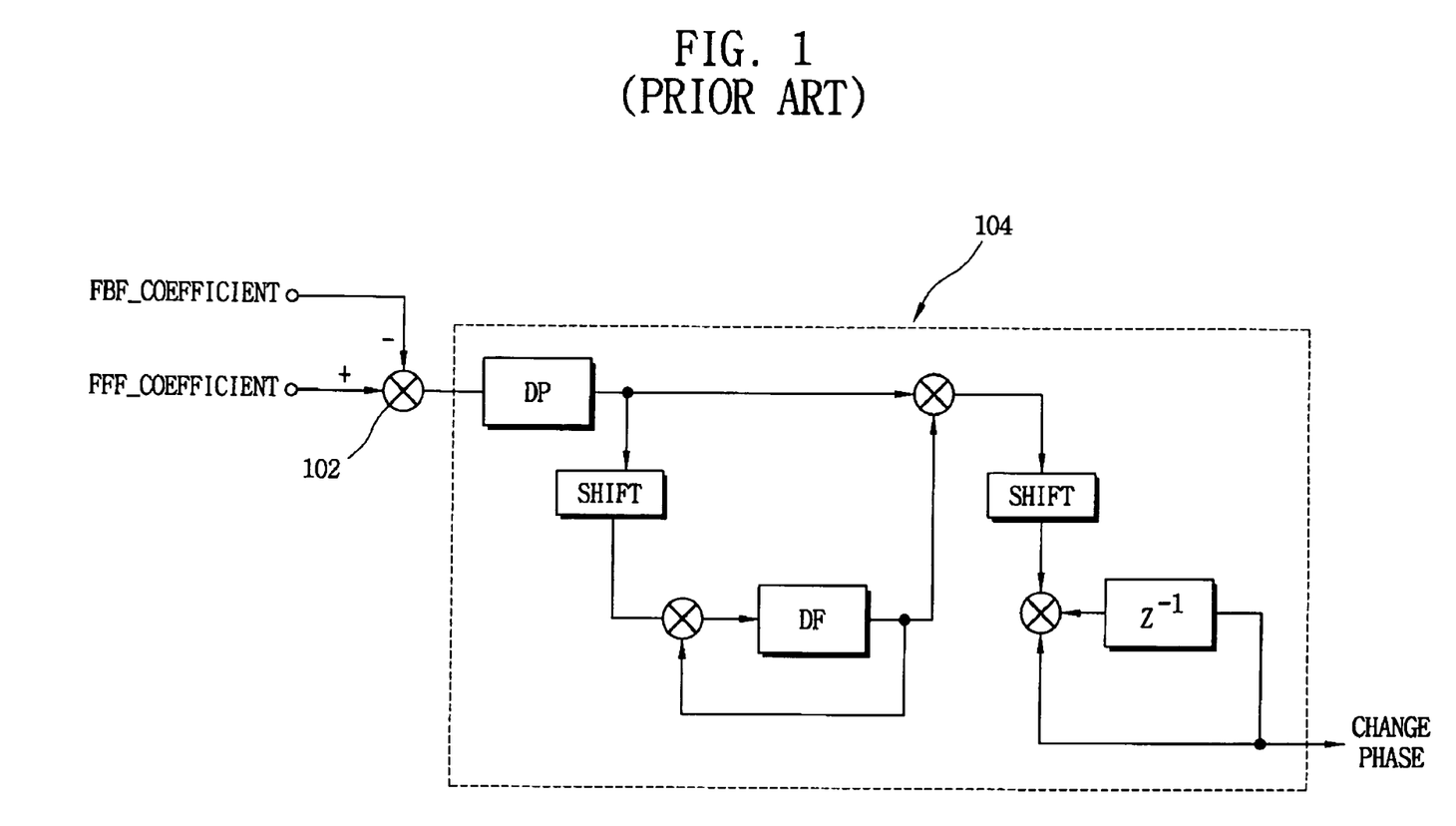
FIG. 1 is a schematic view illustrating a prior art timing recovery method.

FIG. 1 is a schematic view illustrating a prior art timing recovery method. Referring to FIG. 1, to detect timing errors, the prior art timing recovery method extracts a precursor and a postcursor using a difference between a coefficient value of a Feed-Forward Filter (FFF) of the DFE and a coefficient value of a FBF (Feed-Back Filter) of the DFE.

A precursor represents a signal component corresponding to a front part of an impulse response of a channel (i.e., communication channel) with respect to a signal peak value of the impulse response of the channel. A postcursor represents a signal component corresponding to a rear part of the impulse response of the channel with respect to the signal peak value. ISI may occur due to an overlap between the precursors and the postcursors of at least two neighboring symbols.

The purpose of the timing recovery is to find out the zero-crossing, or generally to find out a transition point of a signal. The zero-crossing represents a zero-crossing of a detected timing error. Thus, the zero-crossing may vary depending on the factor(s) a designer may use so as to detect the timing error. Namely, a desired timing phase may vary depending upon internal filters of the timing recovery circuit and environments, and the algorithm of extracting the timing errors may vary depending upon the applications, for example.

Used for timing recovery, the precursor may be considered as a zero-crossing indicator inserted at a precursor position of a received signal. Such a zero-crossing assists a timing recovery circuit in determining phase relationships between signals, by giving the timing recovery circuit an accurately determinable signal transition point for use as a reference based on future data symbols. A postcursor may be considered as another determinable signal transition point for use as a reference that is based on past data symbols.

The converging properties of the DFE should be such that the DFE may be able to correctly output an estimate of the ISI present in incoming signal samples based on the sequence of past decisions. This ISI represents interference from past data symbols, and is commonly termed postcursor ISI. After convergence of the DFE, the DFE can accurately estimate the postcursor ISI.

An operator 102 subtracts a coefficient value of the FBF from a coefficient value of the FFF. The operation block 104 of FIG. 1, which is known in the art and therefore not described in detail, processes the result of the operator 102 to change phase of the clock. A timing error may thus be extracted from a difference between the coefficient value of the FBF and the coefficient value of the FFF, since the FFF compensates the precursor and the FBF compensates the postcursor, and since coefficient values may vary in proportion to the phase variation of a changed clock.

According to the method as shown in FIG. 1, an initial phase stability is enhanced and a pulse shaping filter is not required, since a timing restoring loop converges to a stable value depending on the converging properties of the DFE. However, the converging properties of the coefficients of the DFE may be greatly affected by the initial phase of a PLL, in the case a PLL is used to extract timing information. The coefficients of the DFE have unstable converging properties and do not converge to a stable value when the initial phase has the property in which the difference between the coefficient value of the FBF and the coefficient value of the FFF is maintained, in addition to a small timing error being maintained with respect to the initial coefficient value of the DFE.

Figure 2:
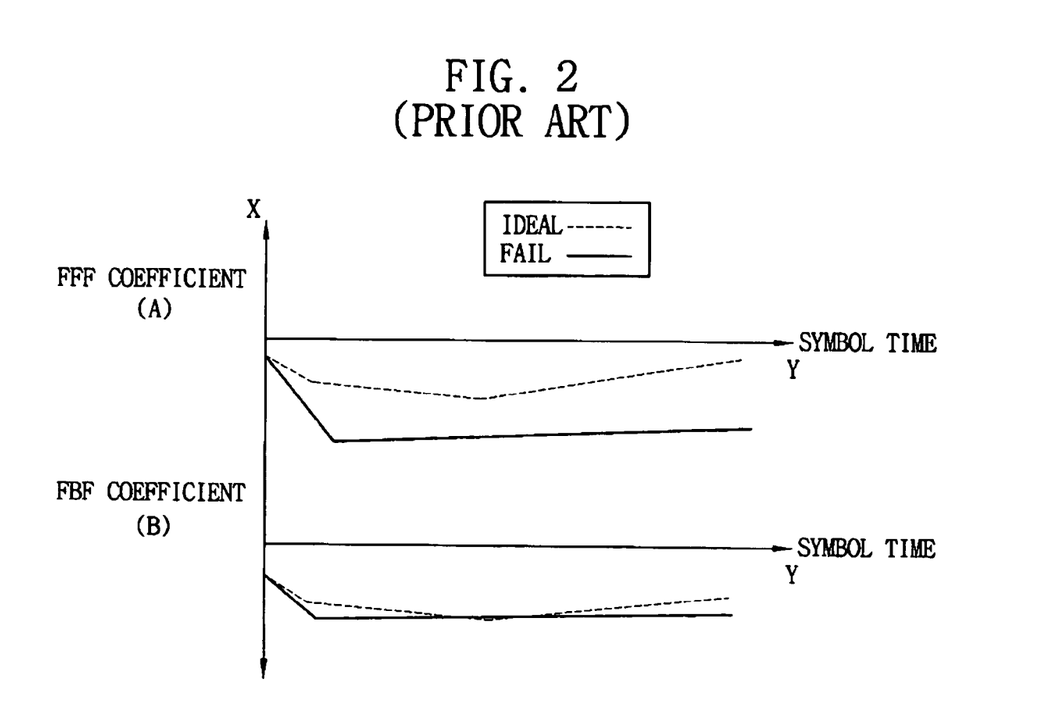
FIG. 2 is a graph illustrating converging properties of the coefficients of a DFE according to a worst initial phase, based on the prior art timing recovery method of FIG. 1.

FIG. 2 is a graph illustrating converging properties of the coefficients of a DFE according to a worst initial phase, based on the prior art method of FIG. 1. A worst initial phase is when the difference between the coefficient value of the FBF and the coefficient value of the FFF is relatively small, but the difference between the coefficient value of the FBF (FFF) and the initial coefficient value of the FBF (FFF) is relatively large. Referring to FIG. 2, the upper graph (A) illustrates a converging property of the coefficient value of the FFF according to a worst initial phase, and the lower graph (B) illustrates a converging property of the coefficient value of the FBF according to the worst initial phase.

In graph (A), the y-axis represents a symbol time, the x-axis represents the coefficient value of the FFF, the dotted line represents the FFF coefficient value having ideal converging property, and the solid line represents a FFF coefficient that fails to converge to an approximately constant value. In other words, the FFF coefficient of the solid line does not approach a stable value. Similarly in graph (B), the y-axis represents a symbol time. The x-axis represents the coefficient value of the FBF, the dotted line represents the FBF coefficient having ideal converging property and the solid line represents the FBF coefficient that fails to converge. The FBF coefficient of the solid line thus does not approach a stable value. Accordingly, the converging property of the DFE may be inadequate, depending on the initial phase of timing recovery; thus the prior art method of FIG. 1 requires a control block for controlling the initial phase, as described by the M&M algorithm.

Figure 3:
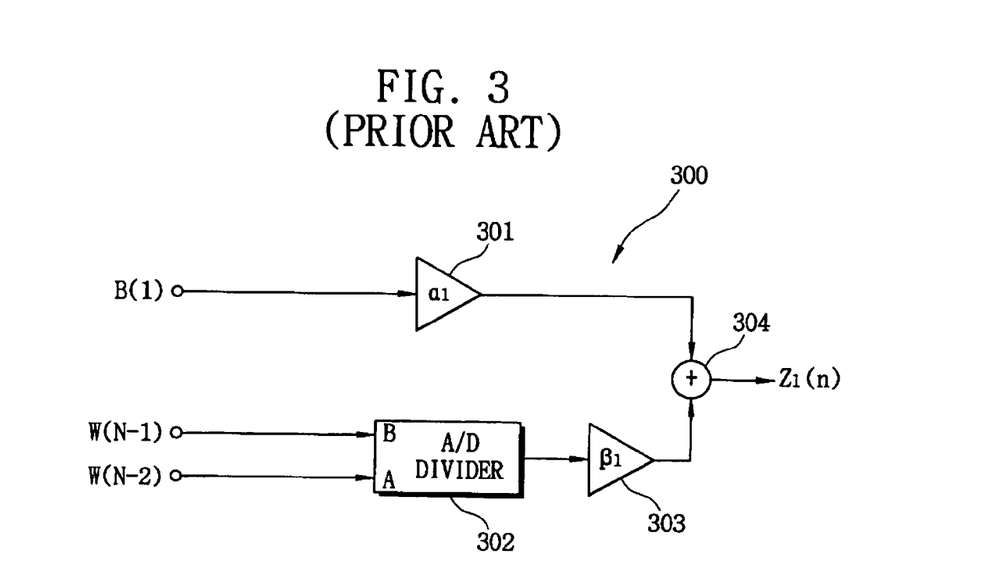
FIG. 3 is a block diagram illustrating a prior art error detector for timing recovery.

FIG. 3 is a block diagram illustrating a prior art error detector for timing recovery. This error detector is disclosed in PCT Laid-open Publication No. WO 01/52469, published and entitled "Baud-rate timing recovery". Referring to FIG. 3, an error detector receives coefficient values of the FFF and FBF from a DFE of a receiver, and calculates a timing error that is output to a loop filter.

Referring to FIG. 3, a first postcursor b(1) is input to an amplifier 301 where it is scaled ($\alpha 1 \times (b1)$). Precursors w(N−1) and w(N−2) are inputted to a divider 302 to be divided to a result w(N−2)/w(N−1), which is input to an amplifier 303, and scaled as $\beta 1 \times w(N-2)/w(N-1)$. An adder 304 sums outputs of amplifiers 301 and 303 to output a timing function z1(n). The timing function z1(n) is shown in expression 1.

$$z1(n) = a1 \times (b1) + \beta 1 \times \frac{w(N-2)}{w(N-1)} = \frac{\alpha 1(h1) - \beta 1 h(-1)}{h(0)} \quad (1)$$

According to FIG. 3, since the scale factors $\alpha 1$, $\beta 1$ should be estimated based on asymmetric property of input signals, impulse response of specific channels should be known. Therefore, large timing errors may occur for unknown channels or for properties of a channel that vary over time.

SUMMARY OF THE INVENTION

An exemplary embodiment of the present invention is directed to a timing recovery circuit for a receiver. The timing recovery circuit may include a timing error detector that generates a timing error based on differences between coefficients of a feed-forward filter and a feed-back filter. The timing recovery circuit may also include a loop filter which generates a control voltage signal based on the timing error, and a voltage controlled that generates a sampling clock for the receiver based on the generated control voltage signal.

Another exemplary embodiment of the present invention is directed to a method of recovering symbol-rate timing for a receiver having a decision feedback equalizer that includes a feed-forward filter and a feed-back filter. A timing error may be generated as a function of a first difference between a dominant precursor tap coefficient value of the feed-forward filter and a center tap coefficient value of the feed-back filter. The timing error may be revised by generating a first modified timing error as a function of a second difference between a first initial coefficient value and a converging value of the dominant precursor tap coefficient of the feed-forward filter. The first modified timing error may be revised by generating a second modified timing error as a function of a third difference between a second initial coefficient value and a converging value of the center tap coefficient of the feed-back filter. The second modified timing error may be output to generate a control voltage signal for controlling a sampling clock of the receiver for sampling a received signal.

BRIEF DESCRIPTION OF THE DRAWINGS

The above and other advantages of the present invention will become more apparent by describing in detail the preferred embodiments thereof with reference to the accompanying drawings, in which.

DETAILED DESCRIPTION OF THE EXEMPLARY EMBODIMENTS

Figure 4:
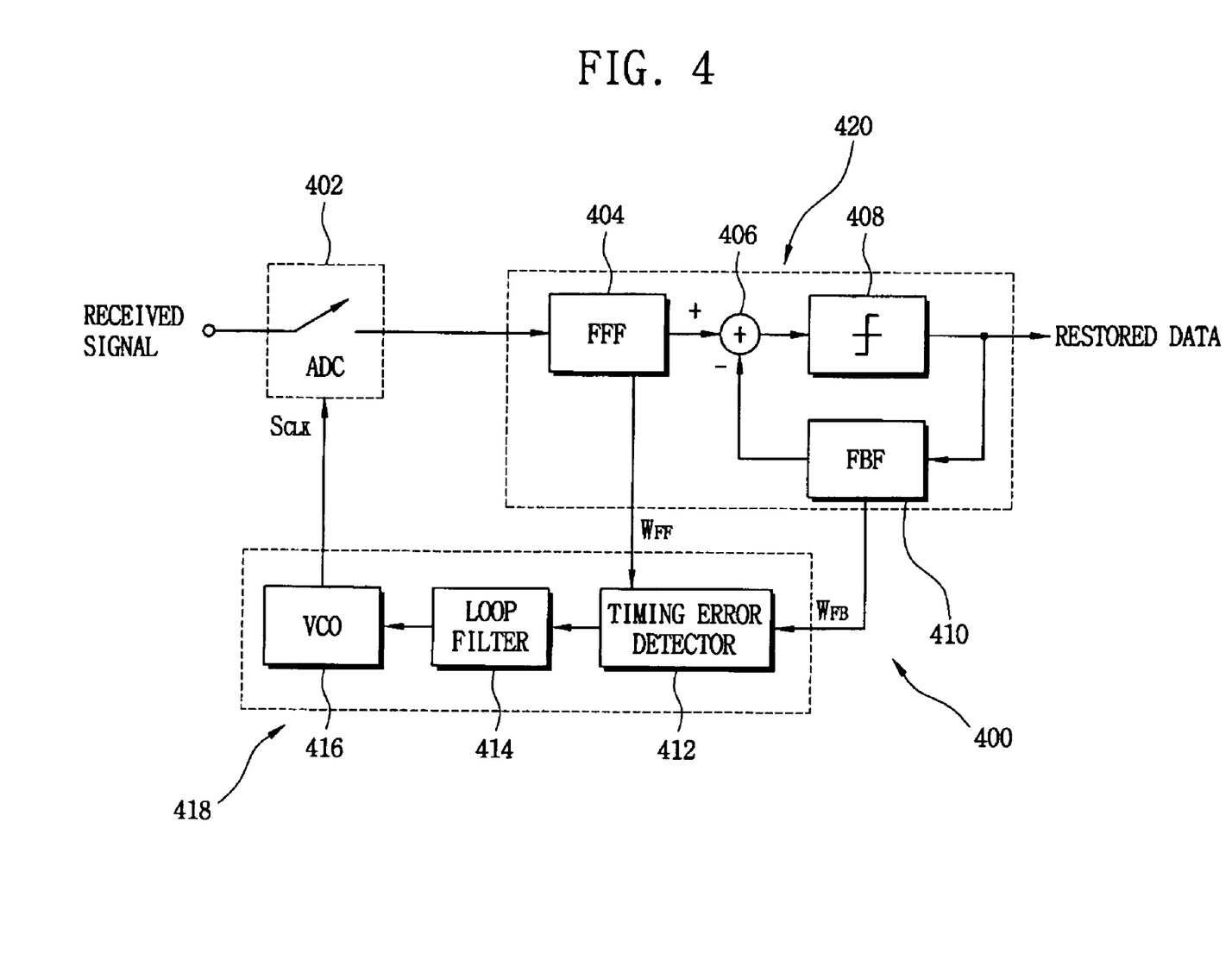
FIG. 4 is a block diagram of a timing recovery system according to an exemplary embodiment of the present invention.

FIG. 4 is a block diagram illustrating a timing recovery system according to an exemplary embodiment of the present invention. Referring to FIG. 4, system 400 may be implemented within a symbol-rate receiver, for example, and may include an analog-to-digital converter (ADC) 402, a decision feedback equalizer (DFE) 420 and a timing recovery circuit 418. The timing recovery circuit 418 may include a timing error detector 412, a loop filter 414 and a voltage controlled oscillator (VCO) 416. Timing error detector 412, loop filter 414 and VCO 416 together may form a Phase-Locked Loop (PLL). A feed-forward filter (FFF) 404 and a feedback filter (FBF) 410 are included in DFE 420 in an effort to reduce pre-cursors and post-cursors of the channel impulse response, respectively.

Referring to FIG. 4, the ADC 402 samples a received signal (which may be a continuous-time signal for example) using a sampling clock (SCLK) and converts the continuous-time signal to a discrete-time signal. The ADC 402 converts the received analog signal to digital data, which may be referred to as first digital data. As will be explained in further detail below, the FFF 404 compensates a precursor of the first digital data, which is output to adder 406. The adder 406 subtracts digital data having a compensated postcursor from the first digital data having a compensated precursor (output of FFF 404). The output of the adder 406 is provided to a decision logic 408, which in turn outputs restored data. The restored data may be referred to as second digital data that is input to FBF 410. As will be described below in more detail, the FBF 410 compensates a postcursor of the second digital data.

Figure 8:
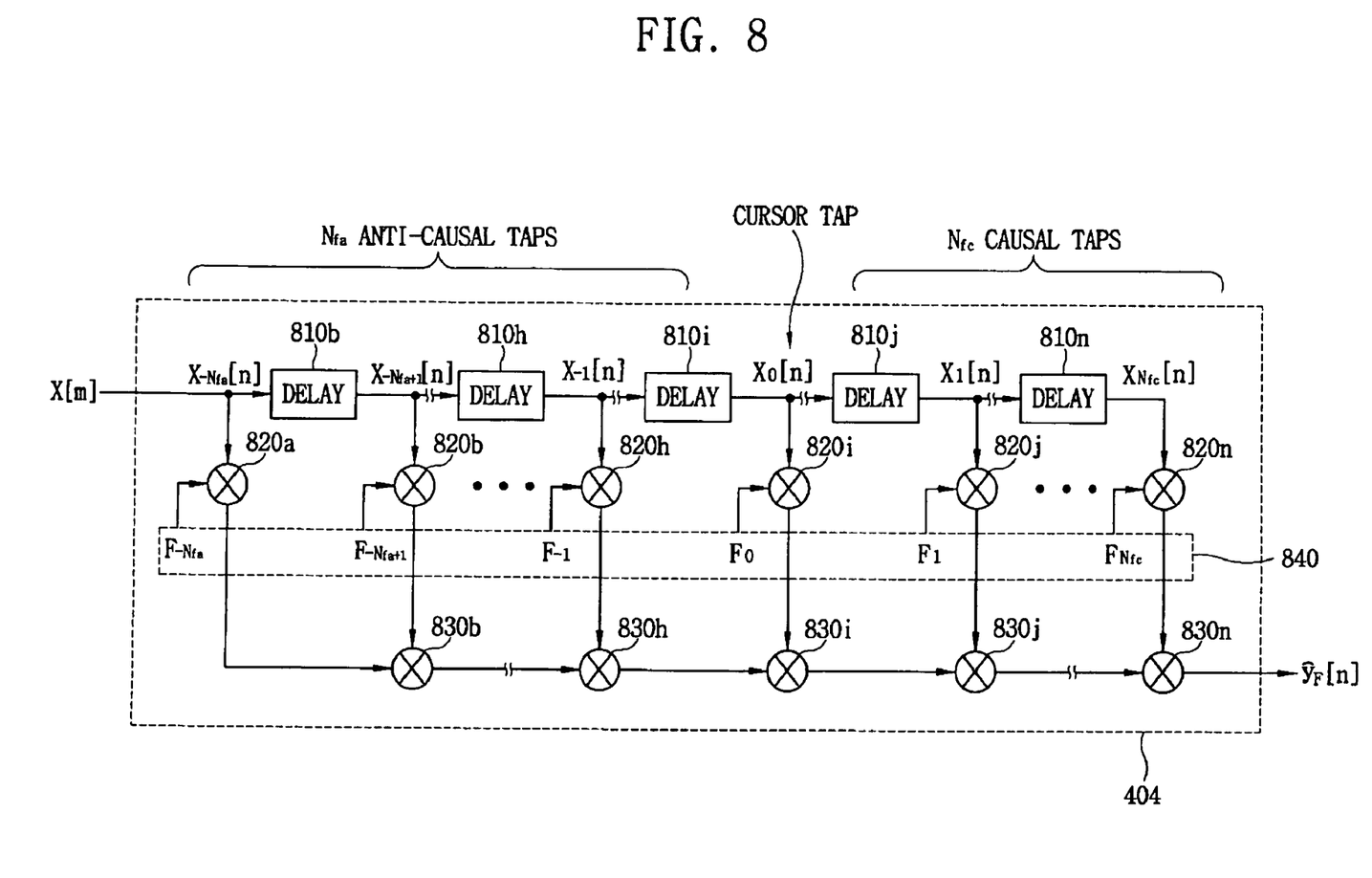
FIG. 8 illustrates an exemplary structure of a feedforward filter and a feedback filter in accordance with an exemplary embodiment of the present invention.

FIG. 8 illustrates an exemplary structure of a feed-forward filter and a feed-back filter in accordance with an exemplary embodiment of the present invention. The structure of each of FFF 404 and FBF 410 being substantially the same, the detailed structure is described primarily for the FFF 404 for reasons of brevity. The FFF 404 (or FBF 410) may include a plurality of delay elements 810b through 810n, a plurality of multipliers 820a-n, a plurality of adders 830a-n and a coefficient compensator 840, for example.

In this example, feed-forward filter 404 may be implemented with a FIR filter having $N_f$ taps. Each tap may correspond to a data sample for a particular sample period. One of the $N_f$ taps may be designated as a "cursor" tap, which is the tap corresponding to a data sample designated as corresponding to the current symbol period. The data sample for the cursor tap may be referred to as the cursor sample. The $N_f$ taps may include $N_{fa}$ anti-causal taps, $N_{fc}$ causal taps, and the cursor tap (i.e., $N_f = N_{fa} + N_{fc} + 1$). An anti-causal tap is one in which the corresponding data sample arrives after (or later than) the cursor sample. A causal tap is one in which the corresponding data sample arrives before (or prior to) the cursor sample.

As shown in FIG. 8, the first digital data samples from ADC 402, here shown as x[m], may be provided to delay elements 810b through 810n (for FBF 410, x[m] would represent the restored data (second digital data) received from decision logic 408). Each delay element 810 may provide one sample period of delay. One of the taps may be denoted as the cursor tap. The $N_{fa}$ anti-causal taps may be located to the left of the cursor tap, and the $N_{fc}$ causal taps may be located to the right of the cursor tap, for example. The first digital data samples, x[m], and the outputs from delay elements 810b through 810n may collectively represent the data samples for the $N_f$ taps (i.e., the contents of the FIR filter).

For each symbol period, the data samples for the $N_f$ taps may be provided to multipliers 820a through 820n. Each multiplier 820 may receive a respective data sample, which is denoted as $x_i[n]$, and further receives a respective filter coefficient value $F_i$ from coefficient compensator 840 of the FFF 404 (or FBF 410), where i may represent the tap index and $i = N_{fa} \ldots -1, 0, 1, \ldots N_{fc}$. A given coefficient value may be compensated based on channel status. Each multiplier 820 multiplies the received data sample $x_i[n]$ with the received coefficient value $F_i$ to provide a corresponding scaled sample. The $N_f$ scaled samples from multipliers 820a through 820n are then summed by adders 830b through 830n to provide a filtered symbol for that symbol period that may be input to adder 406 in FIG. 4. Thus, a coefficient value of the FFF 404 (or a coefficient value of the FBF 410) may be compensated based on a channel status. For example, the FFF 404 may compensate a precursor of the first digital data, and the FBF 410 may compensate a postcursor of the second digital data.

The feed-forward and feedback filters 404 and 410 may each be implemented with any number of taps. More taps may allow these filters to better correct for frequency distortion in the received signal and to process multipaths having larger time offsets. However, more taps may correspond to increased complexity, more computations to adapt the taps, and possibly longer convergence time. The number of taps may thus be selected based on a number of factors such as, for example, cost, performance, complexity, etc. Referring now to FIG. 4, the FBF 410 removes the ISI (Inter Symbol Interference) of a present symbol generated by the output signal of the decision logic 408. The FFF 404 removes the ISI (Inter Symbol Interference) of a present symbol generated by the output signal that is not processed by the decision logic 408. As discussed above with respect to FIG. 8, the coefficients of the FFF 404 and FBF 410 may be compensated based on channel status. For example, the coefficients of the FFF 404 and FBF 410 may be adaptively adjusted depending on the channel status using algorithms such as LMS (Least Mean Square), RLS (Recursive Least Square), CMA (Constant Modulus Algorithm) and MMA (Multi-Modulus Algorithm), etc.

Accordingly, DFE 420 feeds back the decision value (the output of the decision logic 408) using the FBF 410 to remove the postcursor, so that the ISI due to the postcursor of previous symbols may be removed. The decision value is related with the filtering result of the FFF 404. A desired timing error may be obtained at the instance when the estimated coefficient of the precursor is the same as the estimated coefficient of the postcursor, and the input symbol is sampled using the timing phase having the zero-crossing, so that the impulse response of the channel shows a symmetric distribution. When the impulse response of the channel has the symmetric distribution, the DFE converges to have a minimum timing error.

Figure 5:
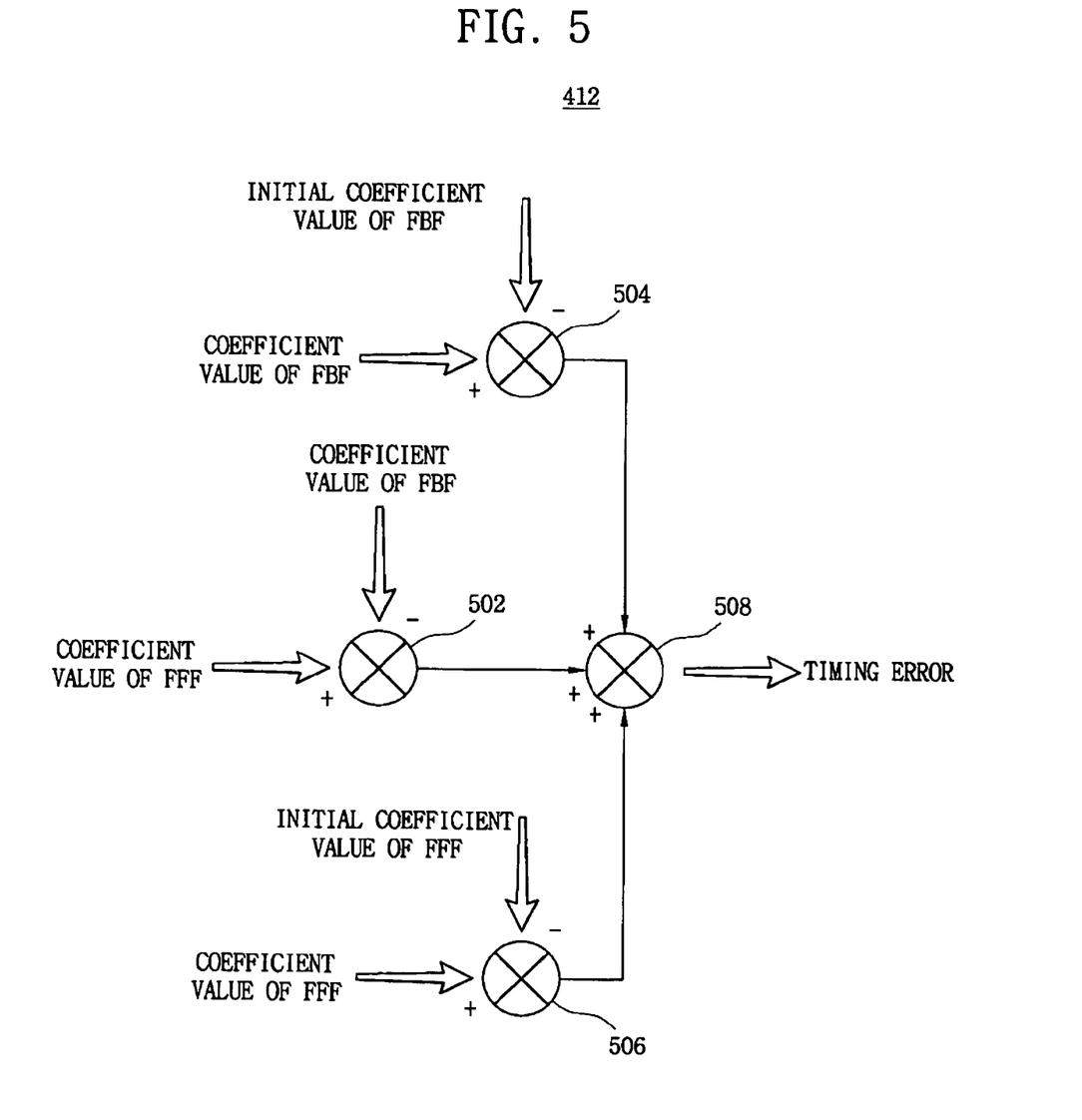
FIG. 5 is a block diagram of a timing error detector in accordance with an exemplary embodiment of the present invention.

FIG. 5 is a block diagram of a timing error detector in accordance with an exemplary embodiment of the present invention. Referring to FIG. 5, the timing error detector 412 may include a first operator 502 that subtracts a current coefficient value of the FBF 410 from the current coefficient value of the FFF 404. A second operator 504 subtracts an initial coefficient value (which may be set in advance, for example) of the FBF 410 from the current coefficient value of the FBF 410. A third operator 506 subtracts an initial coefficient value of the FFF 404 from the coefficient value of the FFF 404. The fourth operator 508 sums outputs of the first, second and third operators 502, 504 and 506 to obtain the timing error.

The timing error detector 412 thus receives coefficient values (initial and current coefficient values) from the FFF 404 and FBF 410 to calculate a timing error that is output to the loop filter 414. In response to the received timing error, the filter 414 outputs a control voltage signal to the VCO 416. The VCO 416 generates an oscillating signal (i.e., the sampling clock is generated by the timing recovery circuit 418) at varying frequencies and phases, in response to the control voltage signal. The VCO 416 thus controls the sampling phase of the ADC 402 with the sampling clock (SCLK).

Figure 9:
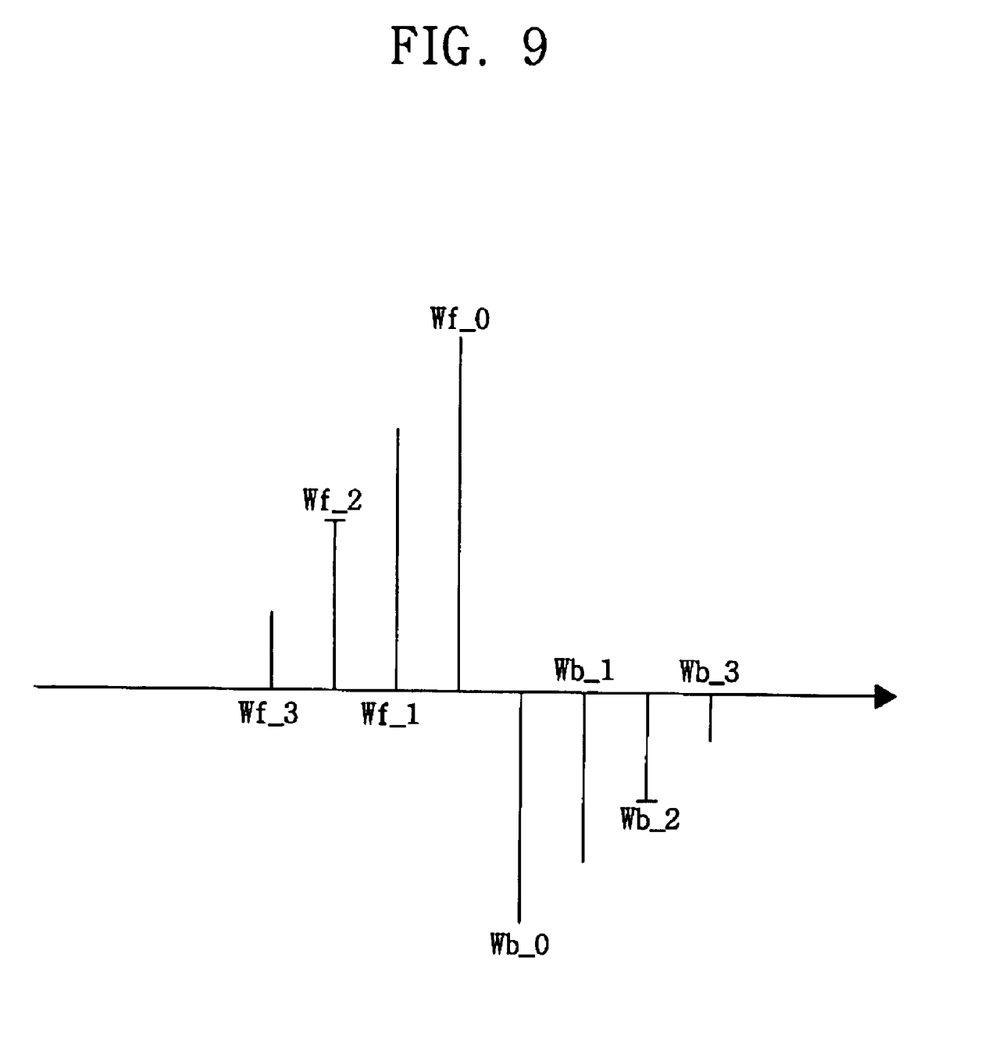
FIG. 9 is an exemplary graph of filter coefficients for the DFE 420.

FIG. 9 is an exemplary graph of filter coefficients for the DFE 420 over time, so as to explain center tap coefficients and dominant precursor and postcursor tap coefficients for the FFF 404 and FBF 410. FIG. 9 should be occasionally read with FIGS. 6-7(e). Referring to FIG. 9, there is shown a front part and a rear part of an impulse response of a channel (i.e., communication channel) with respect to a signal peak value of the impulse response of the channel. As discussed previously, ISI may occur due to an overlap between the precursors and the postcursors of at least two neighboring symbols. FIG. 9 thus represents the filter coefficients of the DFE 420. The current filter coefficients wf_1 of the FFF 404 and wb_0 of FBF 410 may be used to reduce ISI, and the initial coefficients of the FFF and FBF may also be used. The center tap coefficient for FFF 404 is wf_0 in FIG. 9, and is wb_0 for FBF 410. For the FFF 404, the dominant precursor tap coefficient value is wf_1. The dominant precursor tap coefficient value represents the maximum value of the precursor. The dorminant postcursor tap coefficient value (maximum value of the postcursor) is wb_0 in FIG. 9.

Figure 6:
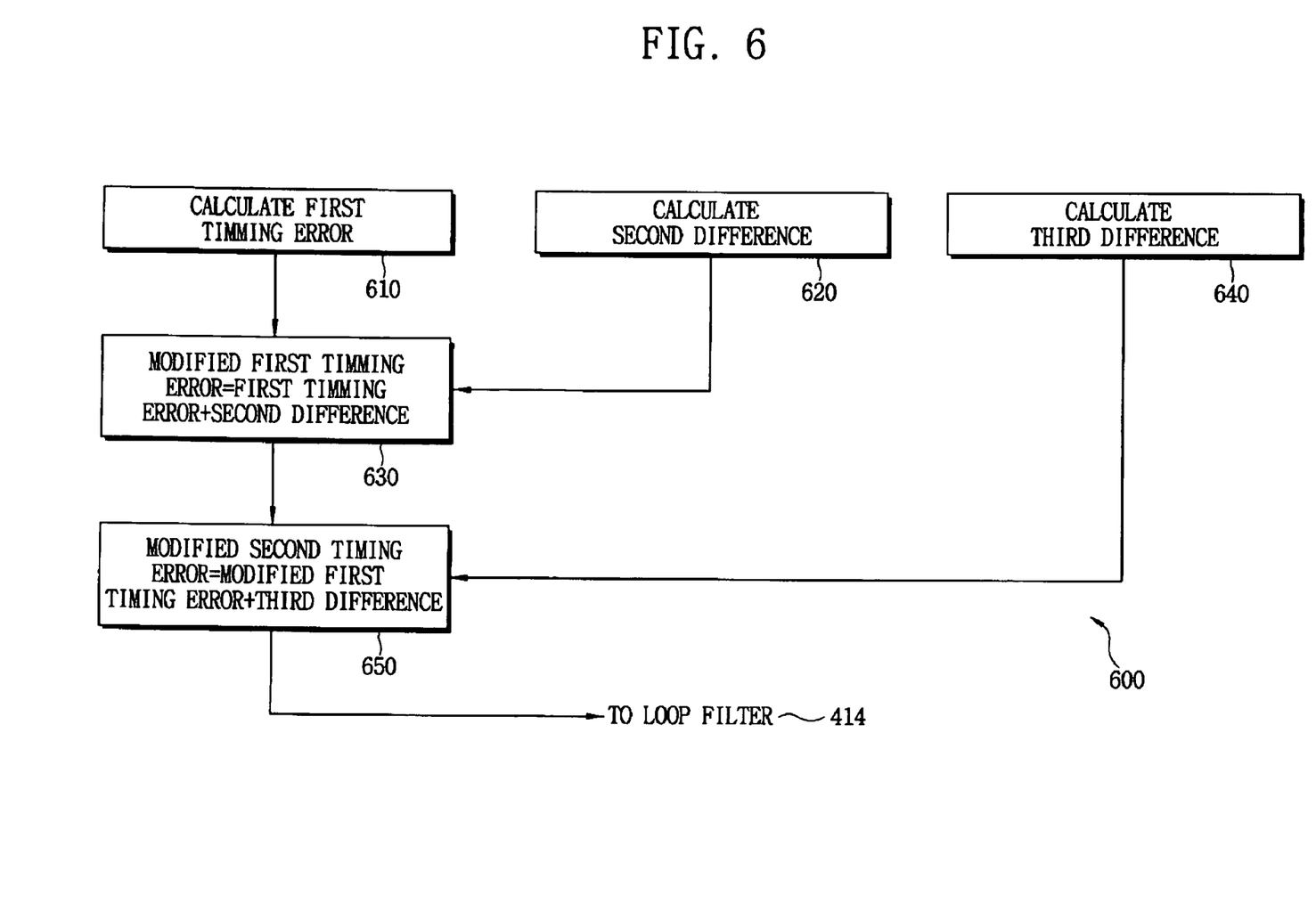
FIG. 6 is a flowchart describing a method of recovering a symbol-rate timing for a receiver according to an exemplary embodiment of the present invention.

FIG. 6 is a flowchart describing a method of recovering a symbol-rate timing for a receiver according to an exemplary embodiment of the present invention. The method 600 may be implemented by the system 400 illustrated in FIG. 4, for example, to recover symbol-rate timing of a symbol-rate receiver employing system 400.

Referring to FIG. 6, a first timing error may be calculated (function 610). The first (or initial) timing error may correspond to a first difference between a dominant precursor tap coefficient value of the FFF 404 and a center tap coefficient value of the FBF 410, for example. A second difference may be calculated (function 620) between an initial coefficient value (set in advance, for example) of the dominant precursor tap coefficient of the FFF 404 and a converging value of the dominant precursor tap coefficient of the FFF 404. The second difference may be added (function 630) to the first timing error to determine a second timing error (a modified first timing error). A third difference (function 640) may be calculated between an initial coefficient value of the center tap coefficient of the FBF 410 and a converging value of the center tap coefficient of the FBF 410. The third difference may be added (function 650) to the second timing error to determine a third timing error (e.g., a modified second timing error) which may be output to the loop filter 414. Thus, a desired timing error may be obtained at an instance when the estimated or calculated coefficient of the precursor is the same as the estimated or calculated coefficient of the postcursor, and an input symbol is sampled using the timing phase having the zero-crossing, so that the impulse response of the channel shows a symmetric distribution. When the impulse response of the channel has a symmetric distribution, the DFE 420 converges to have a minimum timing error.

Figure 7A:
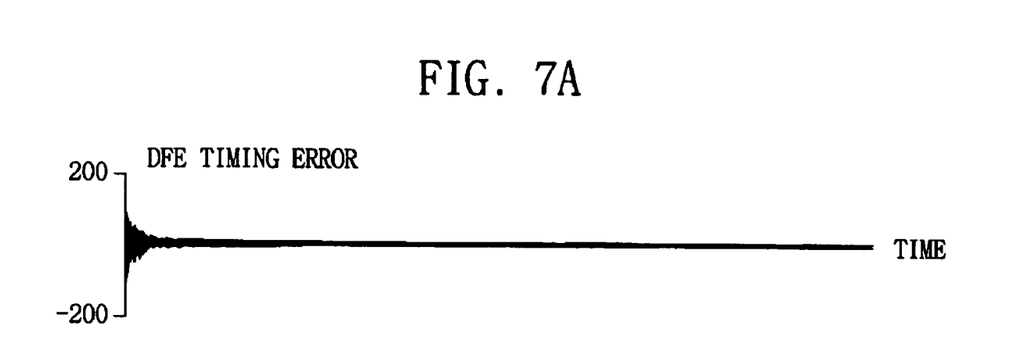
FIGS. 7A-7E are simulation results of the timing recovery system of FIG. 4.

FIGS. 7A-7E are graphs showing simulation results of the timing recovery system of FIG. 4. FIG. 7A shows the timing error of the DFE 420. The DFE timing error may be represented as equal to $D(n)-Y(n)$, where $D(n)$ represents the output of a slicer (decision logic 408), and $Y(n)$ represents the output of the DFE 420. Thus, FIG. 7A represents that the DFE timing error may decrease according to time.

Figure 7B:
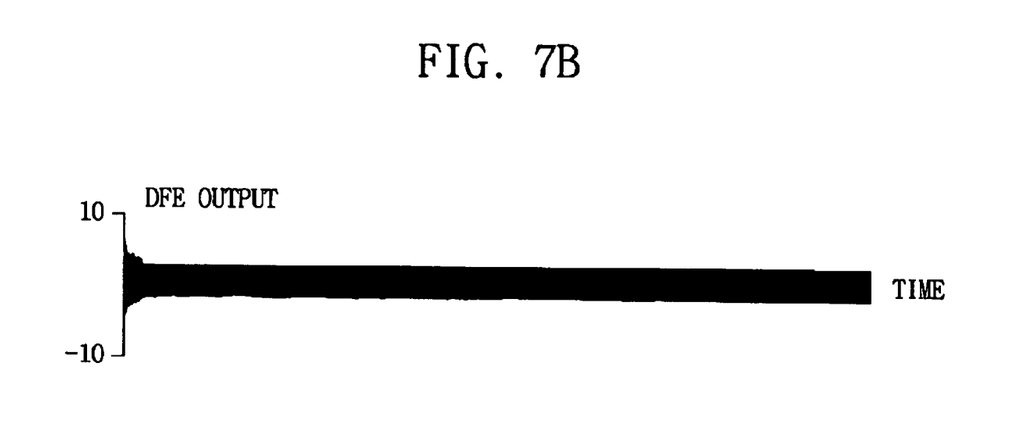
Figure 7C:
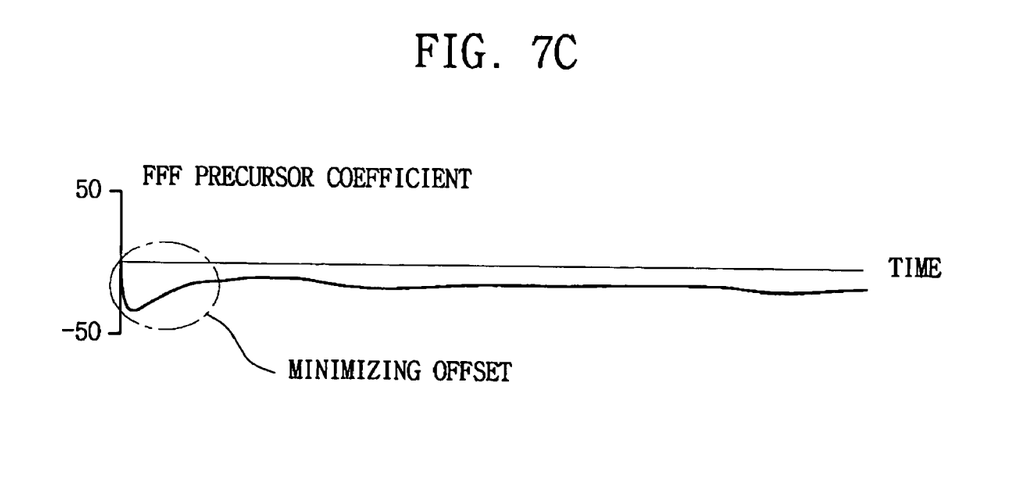
Figure 7D:
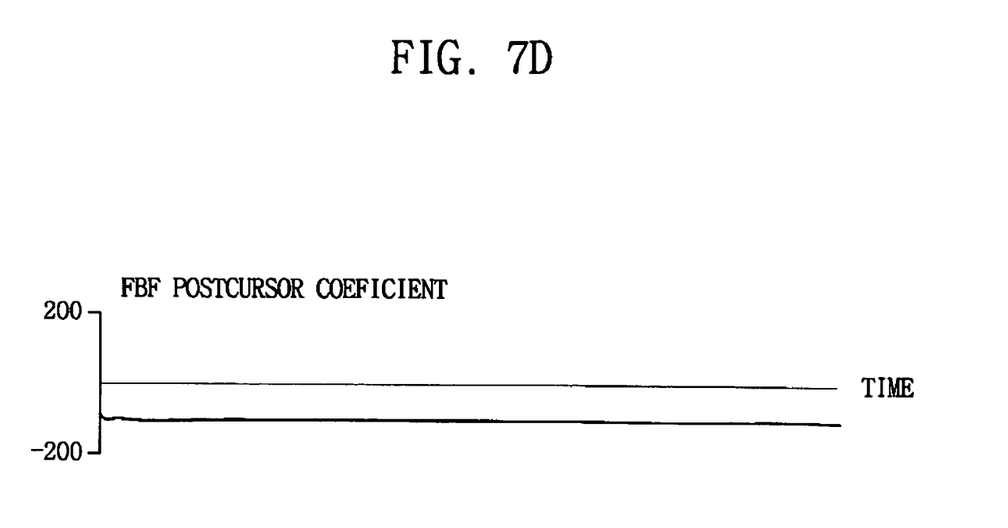

FIG. 7B shows the output, $Y(n)$, of the DFE 420. FIG. 7B shows that the output of the DFE 420 converges to a given value. FIG. 7C shows the precursor coefficient of the FFF 404, and FIG. 7D the postcursor coefficient of the FBF 410. FIG. 7C represents wf_1 of FIG. 9, i.e. the dominant precursor tap coefficient of the FFF 404, and FIG. 7D represents wb_0 of FIG. 9, i.e. the dominant postcursor tap coefficient of the FBF 410. The timing phase may be regulated in order that wf_1 does not vary abruptly in the beginning, so as to prevent the wf_1 coefficient value from having an undesirous convergent property. When wf_1 has an undesirous convergent property, wb_0 also has an undesirous convergent property.

Figure 7E:
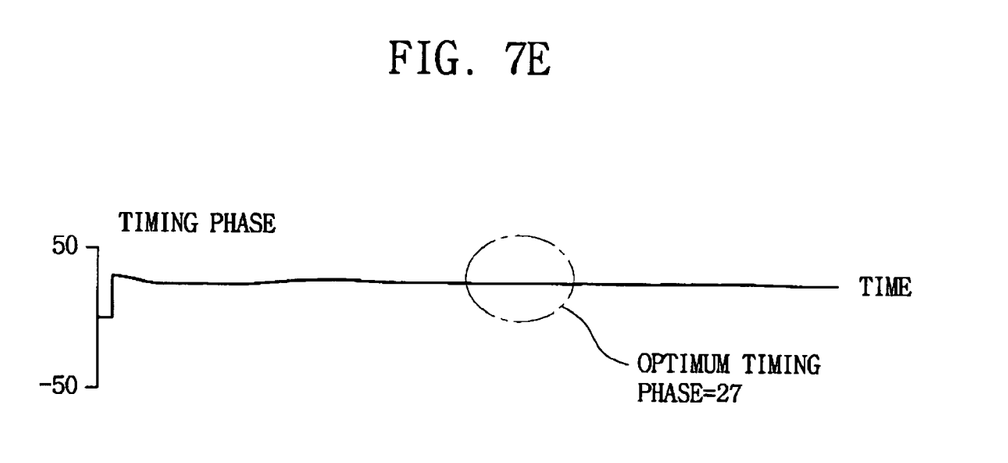

FIG. 7E shows timing phase. FIG. 7E represents a timing phase having a total of 32 multi-phases (0~31). The timing recovery circuit 418 may select one of the 32 multi-phase (0~31). In FIG. 7E, a desired or optimal timing phase may be about 30, and the timing phase may converge to the desired timing phase according to time.

While the exemplary embodiments of the present invention have been described in detail, it should be understood that various changes, substitutions and alterations can be made herein without departing from the exemplary embodiments of the present invention as defined by the appended claims.

What is claimed is:

1. A timing recovery circuit, comprising:
  a timing error detector configured to receive a first current coefficient value and a first given initial coefficient value from a feed-forward filter, to receive a second current coefficient value and a second given initial coefficient value from a feed-back filter, and to determine a timing error based on the received first current coefficient value, first given initial coefficient value, second current coefficient value and second given initial coefficient value;
  a loop filter configured to generate a control voltage signal based on the determined timing error; and
  a voltage controlled oscillator configured to generate a sampling clock in response to the control voltage signal.

2. The circuit of claim 1, wherein the timing error detector includes:
  a first operator for subtracting the second coefficient value from the first coefficient value;
  a second operator for subtracting the second given initial coefficient value from the second coefficient value;
  a third operator for subtracting the first initial coefficient value from the first coefficient value; and
  a fourth operator for summing outputs of the first, second and third operators to obtain the timing error.

3. The circuit of claim 1, wherein the timing recovery circuit is included in a symbol-rate receiver and in communication with a decision feedback equalizer of the receiver that equalizes first digital data of a received signal to generate second digital data, the decision feedback equalizer including the feed-forward filter and the feed-back filter.

4. The circuit of claim 3, wherein the feed-forward filter includes:
- a plurality of shift registers for shifting the first digital data;
- a plurality of multipliers for multiplying outputs of the shift registers by the first current coefficient value;
- a plurality of adders for adding outputs of the multipliers; and
- a coefficient compensator for compensating the first current coefficient value based on a channel status,
- the feed-forward filter compensating a precursor of the first digital data.

5. The circuit of claim 3, wherein the feed-back filter includes:
- a plurality of shift registers for shifting the second digital data; a plurality of multipliers for multiplying each of outputs of the shift registers by the second current coefficient value;
- a plurality of adders for adding outputs of the multipliers; and
- a coefficient compensator for compensating the second current coefficient value based on a channel status,
- the feed-back filter compensating a postcursor of the second digital data.

6. A timing error detector for generating a timing error used to correct symbol-rate timing in a receiver, comprising:
- a first operator subtracting a current feedback filter coefficient value from a current feed-forward filter coefficient value;
- a second operator subtracting a given initial feedback filter coefficient value from the current feedback filter coefficient value;
- a third operator subtracting a given initial feed-forward filter coefficient value from the current feed-forward coefficient value; and
- a fourth operator summing outputs of the first, second and third operators to generate the timing error.

7. A timing recovery circuit for generating a sampling clock to eliminate inter-symbol interference in a receiver, comprising:
- a timing error detector configured to generate a timing error based on differences between tap coefficients of a feed-forward filter and a feed-back filter;
- a loop filter configured to generate a control voltage signal from the timing error; and
- a voltage controlled oscillator configured to generate a sampling clock based on the generated control voltage signal, wherein the timing error detector generates an initial timing error as a function of a first difference between a dominant precursor tap coefficient value of the feed-forward filter and a center tap coefficient value of the feed-back filter and wherein the timing error detector modifies the initial timing error to generate a first modified timing error as a function of a second difference between a given initial coefficient value of the dominant precursor tap coefficient of the feed-forward filter and a converging value of the dominant precursor tap coefficient of the feed-forward filter.

8. The circuit of claim 7, wherein the timing error detector generates the first modified timing error by adding the second difference to the initial timing error.

9. The circuit of claim 8, wherein the timing error detector revises the first modified timing error to generate a second modified timing error as a function of a third difference between a given initial coefficient value of the dominant precursor tap coefficient of the feed-back filter and a converging value of the dominant precursor tap coefficient of the feed-back filter.

10. The circuit of claim 9, wherein the timing error detector generates the second modified timing error for output to the loop filter by adding the third difference to the first modified timing error.

11. A method of recovering symbol-rate timing for a receiver having a decision feedback equalizer that includes a feed-forward filter and a feed-back filter, comprising:
- generating a timing error as a function of a first difference between a dominant precursor tap coefficient value of the feed-forward filter and a center tap coefficient value of the feed-back filter;
- generating a first modified timing error as a function of a second difference between a first initial coefficient value and a converging value of the dominant precursor tap coefficient of the feed-forward filter; and
- generating a second modified timing error as a function of a third difference between a second initial coefficient value and a converging value of the center tap coefficient of the feed-back filter; and
- outputting the second modified timing error to generate a control voltage signal for controlling a sampling clock of the receiver for sampling a received signal.

12. The method of claim 11, wherein the step of generating the first modified timing error includes adding the second difference to the first timing error.

13. The method of claim 11, wherein the step of generating the second modified timing error includes adding the third difference to the first modified timing error.

* * * * *